United States Patent [19]

Kato

[11] Patent Number: 4,523,828
[45] Date of Patent: Jun. 18, 1985

[54] FOCUS DETECTING DEVICE

[75] Inventor: Masatake Kato, Tokyo, Japan

[73] Assignee: Canon Kabushiki Kaisha, Tokyo, Japan

[21] Appl. No.: 616,532

[22] Filed: Jun. 1, 1984

[51] Int. Cl.³ .............................................. G03B 7/08
[52] U.S. Cl. .................................................. 354/403
[58] Field of Search ....................... 354/403, 406–408; 250/201 AF; 356/1

[56] References Cited

U.S. PATENT DOCUMENTS

| 3,443,502 | 5/1969 | Harvey | 354/403 |
| 4,065,778 | 12/1977 | Harvey | 354/403 |
| 4,357,085 | 11/1982 | Niwa et al. | 354/25 |

FOREIGN PATENT DOCUMENTS 2420731  11/1975  Fed. Rep. of Germany ...... 354/403

*Primary Examiner*—William B. Perkey
*Attorney, Agent, or Firm*—Toren, McGeady, Stanger

[57] ABSTRACT

A focus detecting device of the type in which infrared light is projected onto an object, and the reflected light from the object is detected through an objective lens. Focusing conditions of the objective lens are distinquished from each other. The infrared light includes rays of different wavelength with which respective object images are formed by the objective lens and are evaluated by the degree of sharpness. By computing the degrees of sharpness of these infrared images based on an important formula, the focusing condition of the objective lens is determined with respect to visible light. This assures accurate focusing adjustment as the objective lens is interchanged.

6 Claims, 4 Drawing Figures

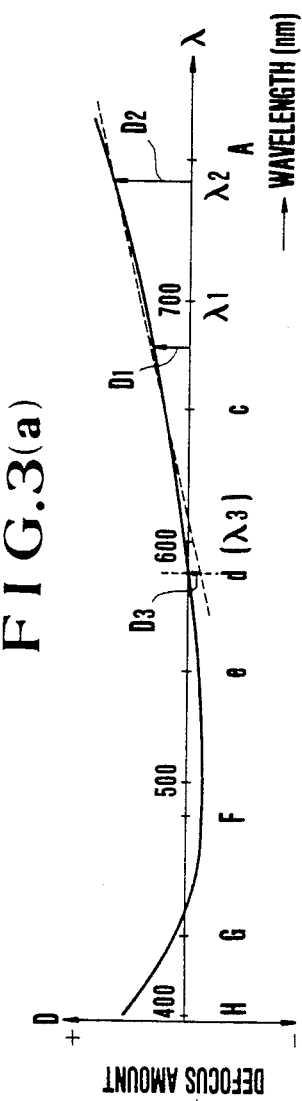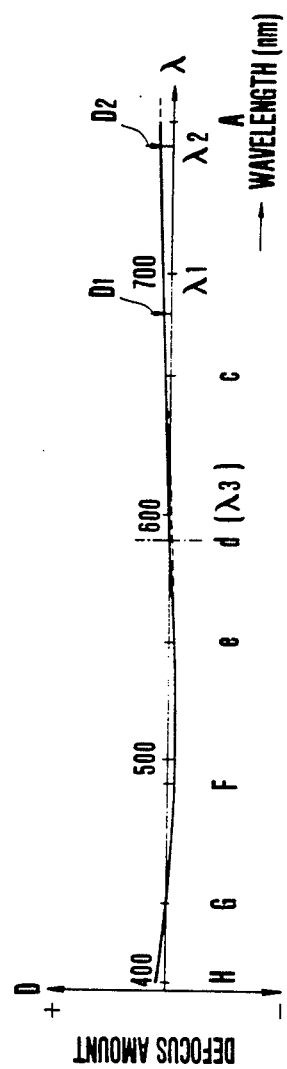

FOCUS DETECTING DEVICE

BACKGROUND OF THE INVENTION

1. Field of the Invention

This invention relates to focus detecting devices of the TTL active type.

2. Description of the Prior Art

The TTL active type focus detecting device is shown in U.S. Pat. No. 4,357,085 (issued Nov. 2, 1982). Because such a device makes use of infrared light, or a light of a wavelength near this as in the luminous output of the metering source, when it is applied to cameras of which the objective lens is interchangeable, for example, single lens reflex cameras, a problem is produced which is shown below.

With the camera employing such a device, the in-focus position of the objective for photographic light (visible light) differs from that for projecting light (infrared light) due to chromatic aberration. In order to detect the in-focus position of the objective for photographic light, it is required that the position of the sensor for detecting the reflected light of the luminous output of the metering source be adjusted in accordance with the chromatic aberration of the objective, or that the output of the sensor be corrected electrically by a factor depending upon the chromatic aberration of the objective. For the objective having large chromatic aberration, such a correction must be made. Otherwise, accurate focus detection would be impossible. Meanwhile, different camera objectives have different chromatic aberrations. When applying such a device to cameras having interchangeable objectives, according to the prior art, each time the objective is attached to the camera, the value of the aforesaid correction factor had to be altered.

That is, common practice in the art is to provide individual objectives with respective different indicators such as pins representing the values of the correction factor for the photographic light relative to the projecting light. When the objective is attached to the camera, its pin either changes the sensor position, or gives necessary information to a signal processing circuit for the sensor output. The use of such a compensation method for chromatic aberration led to an increase in the complexity of the auto-focus camera structure employing such a device. Without the use of such indicators, the necessary compensating operation becomes extremely difficult to perform by hand.

Considering such situations, the present invention has been made, and its object is to provide a focus detecting device of the TTL active type which deletes the necessity of using the chromatic aberration indicator for the objective, while still making it possible to perform accurate focus detection even when the objective is interchanged.

Other objects of the invention will become apparent from the following description of embodiments thereof.

SUMMARY OF THE INVENTION

A device for detecting the focusing of an objective lens for light of a standard wavelength comprising projecting means for projecting lights of different wavelengths from each other onto an object and sensing means for sensing the reflected lights from the object. The device also includes discriminating means for detecting the focusing states of the objective lens for the respective wavelengths of light based on the outputs of the sensing means and for computing the focusing state of the objective lens for light of standard wavelength from the focusing states of the objective lens for different wavelengths of light.

BRIEF DESCRIPTION OF THE DRAWINGS

FIGS. 3(a) and 3(b) respectively illustrate variations of the chromatic aberrations of two different objectives with their wavelengths.

DETAILED DESCRIPTION OF THE PREFERRED EMBODIMENTS

Figure 1:
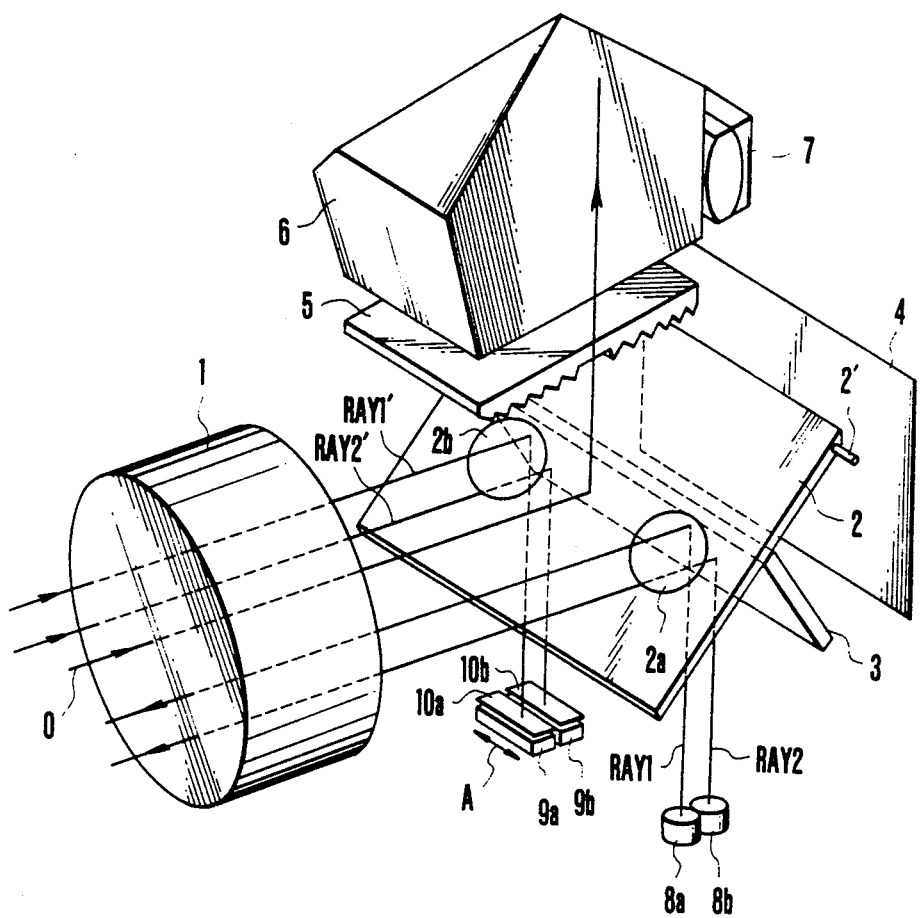
FIG. 1 is a perspective view of an embodiment of the focus detecting device according to the present invention.

FIG. 1 is a perspective view of a single lens reflex camera to which the present invention is applied. In this drawing, an objective 1 is releasably attached to a camera body (not shown). A quick return mirror 2 selectively directs, the light from the objective 1 to either finder optical system to be described later, and an image pickup plane (film plane) 4 of the camera is pivotally supported by a shaft 2' upon actuation of a camera release to move upward or retract from an optical path between the objective lens 1 and the image pickup plane 4 and upon exposure completion returns to the illustrated position. This mirror 2 is provided with two round half-mirrored portions 2a and 2b at almost symmetrical positions with respect to an optical axis O of the objective lens 1. A submirror 3 is pivotally supported on the mirror 2 and cooperates with the mirror 2 in such a manner that when the camera is making an exposure, the half-mirrored portions 2a and 2b of the mirror 2 are shut.

A focusing screen 5 in a conjugate position to the image pickup plane 4, a penta prism 6 and an eye-piece 7 constitute a finder optical system for observing an image formed on the focusing screen 5 with the light from the objective lens 1.

Light-emitting elements 8a and 8b are, for example, IREDs, of which the luminous outputs are infrared or have wavelengths near thereto. These light-emitting elements 8a and 8b are parallel to the optical axis of the objective lens 1 on the bottom of a mirror box (not shown). Lights RAY1 and RAY2, produced from the respective light-emitting elements 8a and 8b, are reflected by the submirror 3 parallel to the optical axis O of the objective lens 1 and are then projected past the half-mirrored portion 2a from the objective lens 1 onto the object. Again the light RAY1 and RAY2 of the light-emitting elements 8a and 8b respectively have different wavelengths λ1 and λ2. For example, the wavelength λ1 of the light RAY1 is about 680 (nm), representing a near infrared light, and the wave length λ2 of the light RAY2 is about 740 (nm), representing an infrared light. Sensors 9a and 9b detect reflected lights RAY1' and RAY2' from the object exposed to the lights RAY1 and RAY2. Each of the sensors 9a, 9b is constructed with a plurality of photo-electric transducer elements perpendicular (indicated by arrow A) to the optical axis O of the objective lens 1. The sensors 9a and 9b are positioned on the bottom panel of the mirror box in such relation to the light-emitting elements 8a and 8b that the sensor 9a receives the reflected light RAY1' based on the light RAY1 from the light-emitting element 8a, and the sensor 9b receives the reflected light RAY2′ based on the light RAY2 from the light-emitting element 8b. The reflected lights RAY1′ and RAY2′ from the object, after having passed through the objective lens 1 and the half-mirrored portion 2b, are reflected respectively from the submirror 3 to the sensors 9a and 9b. It is also noted that the sensors 9a and 9b are located so that when the objective lens 1 is in focus, the images formed by the reflected lights RAY1′ and RAY2′ are at the centers of the length of the photo-electric transducer element arrays of the respective sensors 9a and 9b. As the focusing condition of the objective lens 1 changes, the images of the reflected lights RAY1′ and RAY2′ from the object move along respective lines parallel to the direction indicated by arrow A. Therefore, letting N denote the number of photoelectric transducer elements in each of the sensors 9a and 9b, and a(i) and b(i) the outputs of the i-th elements (where i=1, 2, 3, ..., N) of the sensors 9a and 9b respectively, when the maximum outputs a(i) and b(i) are found, the focusing conditions of the objective lens 1 to the projecting lights RAY1 and RAY2 can be specified. That is, the degree of sharpness of the image based on the projecting light RAY1 can be evaluated by the interval between the (N/2)-th photoelectric transducer element and the transducer element of the sensor 9a which has the maximum output a(i). The direction in which the objective lens 1 must be moved to bring the image into sharp focus can be detected by which side of the (N/2)-th element lies the element having the maximum output a(i). Also the other projecting light RAY2 gives more information on the in-focus condition of the objective lens 1. It is also noted that with the sensors 9a and 9b, use may be made of, for example, CCDs.

Band pass filters 10a and 10b respectively move foreign lights positioned just in front of the sensors 9a and 9b. For example, the band pass filter 10a is mainly permeable to the light of wavelength $\lambda 1$ corresponding to the projecting light RAY1, and the filter band pass 10b is mainly permeable to the light of wavelength $\lambda 2$ corresponding to the projecting light RAY2, so that the outputs of the sensors 9a and 9b are not influenced by foreign light. It is noted that in this embodiment, the light-emitting elements 8a and 8b and the sensors 9a and 9b lie in a common plane almost conjugate to the image pickup plane 4.

Figure 2:
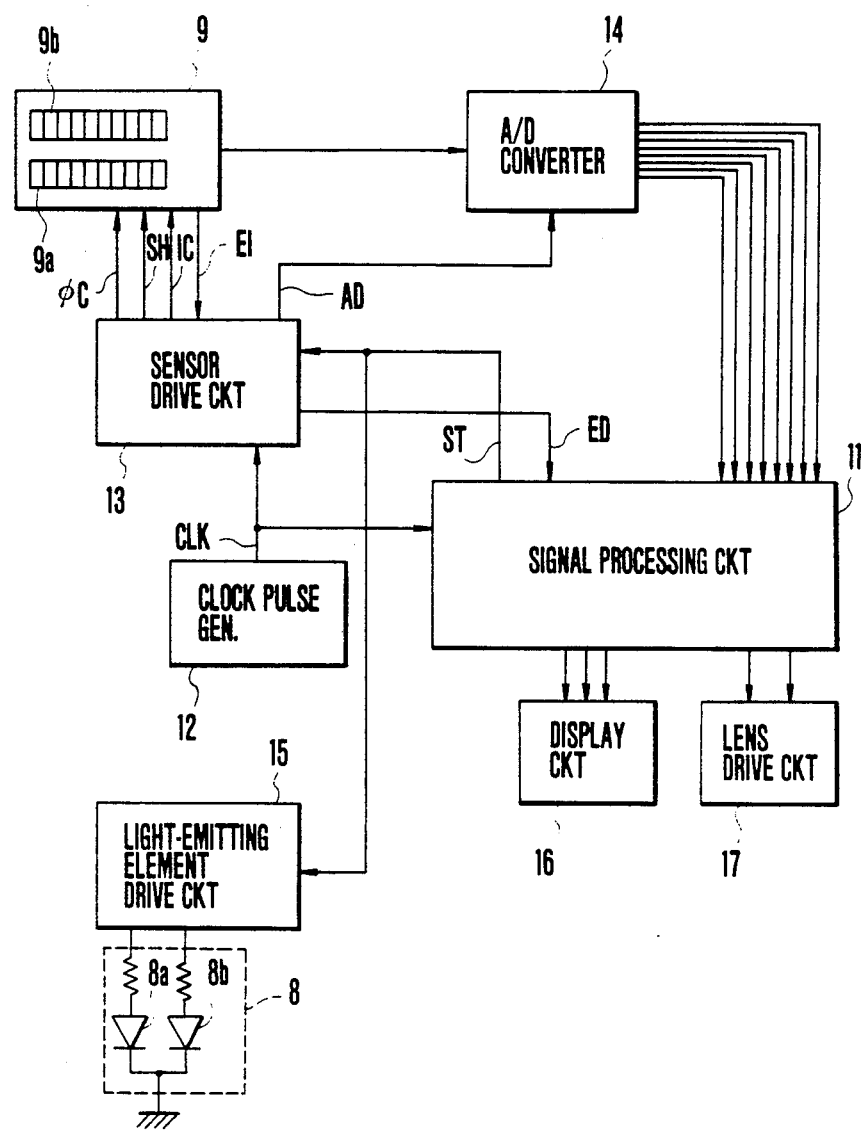
FIG. 2 is a block diagram illustrating an example of a signal processing system in the embodiment of FIG. 1.

Next, the signal processing system shown in FIG. 2 is described. In this drawing, a light-emitting element unit 8, having the light-emitting elements 8a and 8b, and 9 is a sensor unit has the sensors 9a and 9b, and having a common output terminal at which the outputs a(i) and b(i) of the sensors 9a and 9b are produced time-sequentially in the order of a(1), a(2), ... a(N−1), a(N), b(1), b(2), ... b(N−1), b(N). A signal processing circuit 11 is for example, a 1-chip micro-computer having a CPU(-central processing unit), RAM(Random Access Memory) and I/O ports. A clock pulse generating circuit 12 produces a train of clock pulses CLK at a predetermined frequency as soon as a current is initiated; a sensor drive circuit 13 controls the storage and transfer of the photoelectric transducer outputs a(i) and b(i) in the sensor unit 9; an A/D converter circuit 14 converts each photoelectric transducer output a(i) and b(i) transferred from the sensor unit 9 as an analog signal to a 8-bit digital signal; a light-emitting element drive circuit 15 controls the intermittent energization of the light-emitting elements 8a and 8b; a display circuit 16 displays the focusing condition of the objective lens 1 in the finder; a lens drive circuit 17 moves the objective lens 1 to an in-focus position.

The operation of this embodiment is described by reference to the chromatic aberration curves for the objective lens 1 shown in FIGS. 3(a) and 3(b). FIGS. 3(a) and 3(b) illustrate the chromatic aberrations of the lenses 1 of different focal length when in focus for a visible light of about 587 (nm) in wavelength or so-called d-line, taking the de-focus amount (unit: mm) in the ordinate, and the wavelength of light (unit: nm) in the abscissa. The lens 1 of FIG. 3(a) has a focal length of 400 mm, and the lens 1 of FIG. 3(b) has a focal length of 50 mm.

When a release button (not shown) of the camera is stroked once, a battery switch (not shown) is turned on, whereby all the circuitry of FIG. 2 is supplied with current from an electrical power source or battery (not shown). The clock pulse generator circuit 12 produces clock pulses CLK which are given to the signal processing circuit 11 and the sensor drive circuit 13. Also at this time the signal processing circuit 11 gives a start signal ST to the sensor drive circuit 13 and the light-emitting element drive circuit 15. The light-emitting elements 8a and 8b produce the respective projecting lights RAY1 and RAY2 of wavelengths $\lambda 1$ and $\lambda 2$, and the sensor drive circuit 13 produces a clock signal $\phi$ formed on the basis of the clock pulses CLK and a signal IC for initiating storage of photoelectric transducer outputs a(i), b(i) on the sensors 9a and 9b, which are applied to the sensor unit 9. Thereby the sensors 9a and 9b store information corresponding to the light amounts of the images formed on the basis of the reflected lights RAY1′ and RAY2′ and form the photoelectric transducer outputs a(i) and b(i). After that, when stored information reaches a prescribed value, the sensor unit 9 gives a signal EI to the sensor drive circuit 13. Responsive to this, the sensor drive circuit 13 produces an output signal SH, causing the stored outputs a(i) and b(i) of all the photoelectric transducer elements to be transferred in sequence from the sensor unit 9 to the A/D converter circuit 14, and another output signal ED representing the completion of the storage which is applied to the signal processing circuit 11, thereby the light-emitting elements 8a and 8b are de-energized. The A/D converter circuit 14 converts the analog signal to a 8-bit digital signal in synchronization with a converting signal AD from the sensor drive circuit 13, which is then applied to the signal processing circuit 11. In the signal processing circuit 11, these digitalized outputs a(i) and b(i) of all the photoelectric transducer elements are put in sequence into the RAM. After all the outputs a(i) and b(i) have been stored in the RAM, the defocus amount D1 of the objective lens 1 based on the wavelength $\lambda 1$ of the projecting light RAY1 and the de-focus amount D2 of the objective lens 1 based on the wavelength $\lambda 2$ of the projecting light RAY2 are evaluated by computation based on the focus detecting method.

The computing procedure that follows this is described below using the objective lens 1 of which the focal length is 400 mm, attached to the camera body. In the following description, the wavelength of the d-line is represented by $\lambda 3$ (=587 nm) and the defocus amount at the d-line by D3.

The signal processing circuit 11 first determines values of the defocus amounts D1 and D2 of the objective lens 1 for the wavelengths $\lambda 1$ and $\lambda 2$ and then performs computation based on a formula expressed by the line passing through two points ($\lambda 1$, D1) and ($\lambda 2$, D2) in the coordinates in the graph of FIG. 3(a), or a linear function for the defocus amount D in terms of the wavelength λ.

$$D = f(\lambda) = [(D1-D2)/(\lambda1-\lambda2)\cdot\lambda + k \quad (1)$$

(where k is constant)

The line defined by this equation (1) is, as is obvious from FIG. 3(a), approximate to the chromatic aberration curve in a region including the wavelength λ3 of the d-line. Particularly in FIG. 3(b) illustrating the situation when the focal length of the objective lens 1 is 50 mm, it is almost the same.

Therefore, the height of a cross point of this line and a normal line at the position of the d-line from the abscissa may be taken as the defocus amount D3 of the objective lens 1 for the d-line when the values of the defocus amounts D1 and D2 for the λ1 and λ2 are determined. That is, the defocus amount D3 of the objective lens 1 for visible light with the d-line as the standard can be evaluated from the equation (1) as follows:

$$D3 = f(\lambda3) = [(D1-D2)/(\lambda1-\lambda2)]\cdot\lambda3 + K$$

And the signal processing circuit 11 performs such computation to derive the defocus amount D3 of the objective lens 1 with respect to visible light. Then, based on this defocus amount D3, the display circuit 16 displays the objective lens 1 focusing condition in the field of view of the finder, and the lens drive circuit 17 moves the objective lens 1 to an in-focus position. The manner in which such an operation is performed is well known to those skilled in the art, and its detailed explanation is, therefore, omitted here.

Then, the signal processing circuit 11, after evaluation of the defocus amount D3, produces a second start signal ST for the second cycle of a focus detecting operation. So long as the release button of the camera is maintained in the first stroke, such a focus detecting operation is recycled repeatedly. When the release button is pushed down from the first to a second stroke, the camera initiates an exposure operation.

It should be pointed out that in this embodiment, instead of the linear equation (1), another equation of the second degree more approximate to the chromatic aberration curve of each objective lens 1 may be used for computing the in-focus position. Also, instead of using two light-emitting elements 8a and 8b, one light-emitting element of broad spectral characteristics may be used in combination with two filters permeable to different specific wavelength regions from each other for forming different projecting lights. Furthermore, the two light-emitting elements 8a and 8b of this embodiment may be otherwise alternately energized for a predetermined period, so that the number of sensors 9a and 9b is reduced to one.

As has been described, the present invention determines a function representing the approximated line to the chromatic aberration of the objective lens 1 before the defocus amount of the objective lens 1 for visible light is evaluated. Therefore even when chromatic aberration differs when different interchangeable objective lenses 1 are attached to the camera, the in-focus condition of the objective lens 1 for visible light can be established without recourse to either mechanical or electrical correction. Thus, the present invention has achieved the objective of a focus detecting device able for use in cameras having interchangeable objective lenses.

What I claim:

1. A device for detecting the focusing state of an objective lens for a light of standard wavelength, comprising:
   projecting means for projecting lights of different wavelengths from each other onto an object;
   sensing means for sensing the reflected lights from the object;
   discriminating means for detecting the focusing states of the objective lens for the respective wavelengths of light based on the outputs of said sensing means and for computing the focusing state of the objective lens for the light of standard wavelength from the focusing states of the objective lens for the different wavelengths of light.

2. A device according to claim 1, wherein said projecting means projects lights in the infrared region.

3. A device according to claim 2, wherein said discriminating means discriminates the focusing state of the objective lens for the visible light.

4. A device according to claim 3, wherein said discriminating means discriminates the focusing state of the objective lens for a light of the d-line.

5. A device according to claim 1, wherein said discriminating means discriminates the defocus amount of the objective lens for the light of standard wavelength based on the ratio of the difference between the defocus amounts of the objective lens detected based on the respective projected lights to the difference between the wavelengths of the projected lights.

6. A device according to claim 1, wherein said projecting means and said sensing means are arranged adjacent to a conjugate plane to a prescribed focal plane of said objective lens.

* * * * *